United States Patent
Jeffery et al.

(10) Patent No.: US 9,593,893 B2
(45) Date of Patent: Mar. 14, 2017

(54) METHOD OF REMANUFACTURING A SHELL OF A HEAT EXCHANGER AND A REMANUFACTURED SHELL

(71) Applicant: Caterpillar Inc., Peoria, IL (US)

(72) Inventors: Eric R. Jeffery, Peoria, IL (US); John S. Miller, Jr., Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 268 days.

(21) Appl. No.: 14/483,200

(22) Filed: Sep. 11, 2014

(65) Prior Publication Data

US 2016/0076817 A1 Mar. 17, 2016

(51) Int. Cl.
| | |
|---|---|
| *F28D 7/10* | (2006.01) |
| *F28F 9/02* | (2006.01) |
| *B23P 6/00* | (2006.01) |
| *B23P 15/26* | (2006.01) |
| *F28D 7/16* | (2006.01) |

(52) U.S. Cl.
CPC .............. *F28F 9/0226* (2013.01); *B23P 6/00* (2013.01); *B23P 15/26* (2013.01); *F28D 7/16* (2013.01); *F28F 2230/00* (2013.01); *F28F 2265/16* (2013.01)

(58) Field of Classification Search
CPC ........ F28D 7/1638; F28D 9/0093; F28D 9/00; F28D 7/1699; F28F 3/02; F28F 1/02; F28F 3/08; F28F 9/005; F28F 3/00; B23P 15/26

USPC ....... 165/157, 173, 175; 29/890.034, 890.03, 29/890.54
IPC ........................................................ B23P 15/26
See application file for complete search history.

(56) References Cited

U.S. PATENT DOCUMENTS

| | | |
|---|---|---|
| 4,519,445 A | 5/1985 | Norris |
| 4,941,512 A | 7/1990 | Mcparland |
| 5,524,706 A * | 6/1996 | Nakamura ............. C02F 11/20 165/108 |
| 2006/0237166 A1* | 10/2006 | Otey .................... F28F 3/02 165/80.4 |
| 2010/0263845 A1* | 10/2010 | Fujiwara ................ F28B 1/02 165/157 |
| 2010/0288478 A1 | 11/2010 | Barron et al. |
| 2014/0110085 A1* | 4/2014 | Deckers ............... F24H 9/0015 165/80.1 |

FOREIGN PATENT DOCUMENTS

| | | |
|---|---|---|
| CN | 202571929 | 12/2012 |

* cited by examiner

*Primary Examiner* — Davis Hwu

(57) ABSTRACT

A method of remanufacturing a shell of a heat exchanger is provided. The shell has an inner surface that defines an inner diameter thereof and the inner surface has a worn portion adjacent to an end of the shell. The method includes machining the inner surface to remove the worn portion and machining to form a tapered surface adjacent to the end of the shell. A diameter of the tapered surface increases progressively from the inner diameter of the shell to a maximum diameter at the end of the shell.

17 Claims, 5 Drawing Sheets

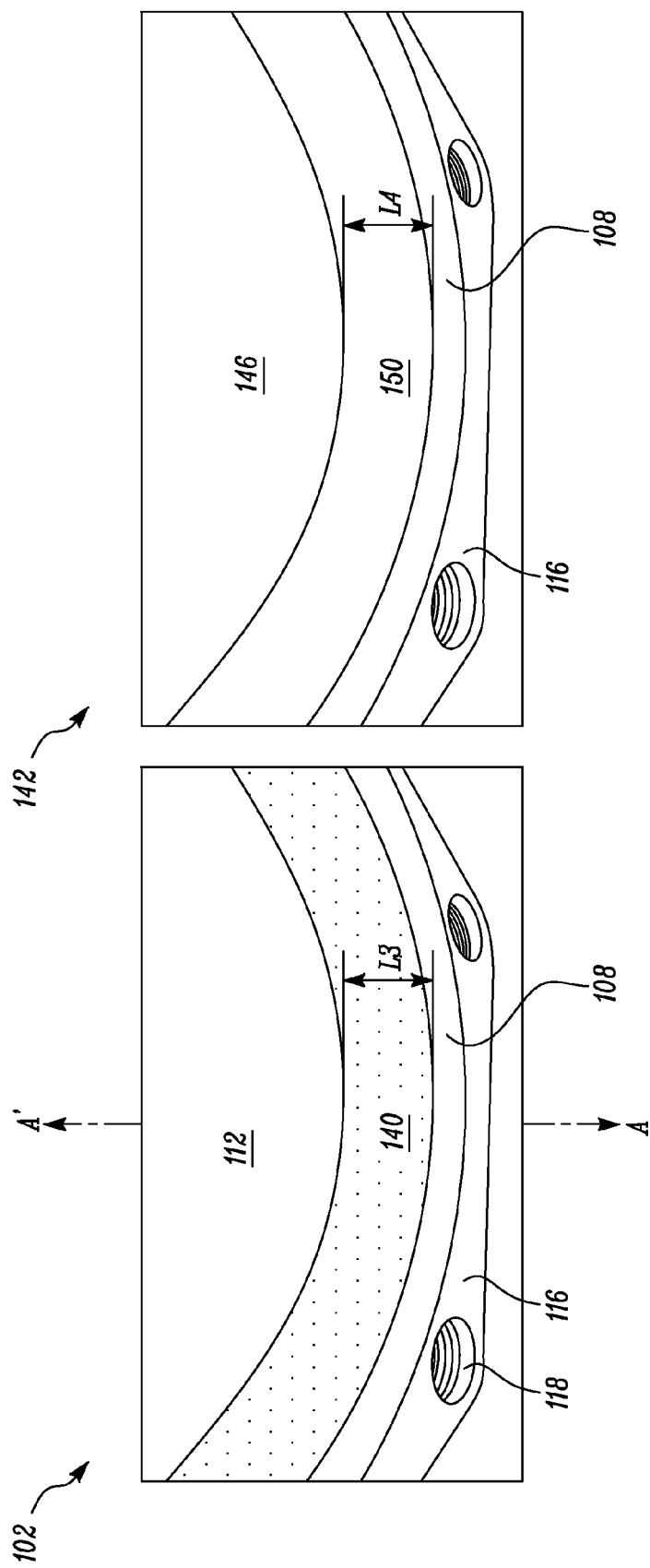

METHOD OF REMANUFACTURING A
SHELL OF A HEAT EXCHANGER AND A
REMANUFACTURED SHELL

TECHNICAL FIELD

The present disclosure generally relates to a heat exchanger. More particularly, the present disclosure relates to a method of remanufacturing a shell of a heat exchanger and a remanufactured shell.

BACKGROUND

Heat exchangers are typically used in various applications. For example, oil coolers may be employed in internal combustion engines to provide cooling of hot oil. These heat exchangers generally include a shell which receives a tube bundle therein. The shell may also receive end sheets adjacent to ends thereof. Typically, the end sheets may be assembled into the shell via a press.

Such an assembly process may cause wear to a portion of the shell onto which the end sheet is assembled. Further, shell may also undergo wear due to prolonged usage. Typically, in such cases, the damaged shell may have to be replaced with a fresh shell, thereby increasing costs.

For reference, U.S. Pat. No. 4,519,445 discloses a method for protecting a tube to tube plate joint in a tube-in-shell heat exchanger, or for repairing a joint of the same kind which has become defective. The method includes employing a sleeve to bridge the joint. The sleeve is sealingly secured at one end to the tube plate within the bore thereof and at the other end within the tube. The joint with the tube is a brazed joint. The inside surface of the tube is machined to provide a tapered surface and the exterior surface of the sleeve is machined to provide a matching tapered surface. The tapered surface has a land and grooves. The sleeve is fitted within the tube with the tapered surfaces in engagement, and the brazed joint is made with braze material contained in grooves that is flowing into a capillary clearance which is of uniform and reproducible dimension from joint to joint.

SUMMARY OF THE DISCLOSURE

In one aspect of the present disclosure, a method of remanufacturing a shell of a heat exchanger is provided. The shell has an inner surface that defines an inner diameter thereof. The inner surface has a worn portion adjacent to an end of the shell. The method includes machining the inner surface to remove the worn portion of the inner surface. The method further includes machining to form a tapered surface adjacent to the end of the shell. A diameter of the tapered surface increases progressively from the inner diameter of the shell to a maximum diameter at the end of the shell.

In another aspect of the present disclosure, a shell for a heat exchanger is provided. The shell includes an inner surface defining an inner diameter of the shell. The shell further includes a tapered surface extending from the inner surface to an end of the shell. A diameter of the tapered surface increases progressively from the inner diameter of the shell to a maximum diameter at the end of the shell.

In yet another aspect of the present disclosure, a heat exchanger is provided. The heat exchanger includes a shell, a tube assembly and an end member. The shell includes an inner surface defining an inner diameter of the shell. The shell further includes a tapered surface extending from the inner surface to an end of the shell. A diameter of the tapered surface increases progressively from the inner diameter of the shell to a maximum diameter at the end of the shell. The tube assembly is at least partly received within the shell. The end member is received in the tapered surface adjacent to the tube assembly.

Other features and aspects of this disclosure will be apparent from the following description and the accompanying drawings.

BRIEF DESCRIPTION OF THE DRAWINGS

FIG. 2 is a partial perspective view of the shell of FIG. 1 showing a worn portion;

FIG. 3 is a partial perspective view of a remanufactured shell, according to an embodiment of the present disclosure;

DETAILED DESCRIPTION

Figure 1:
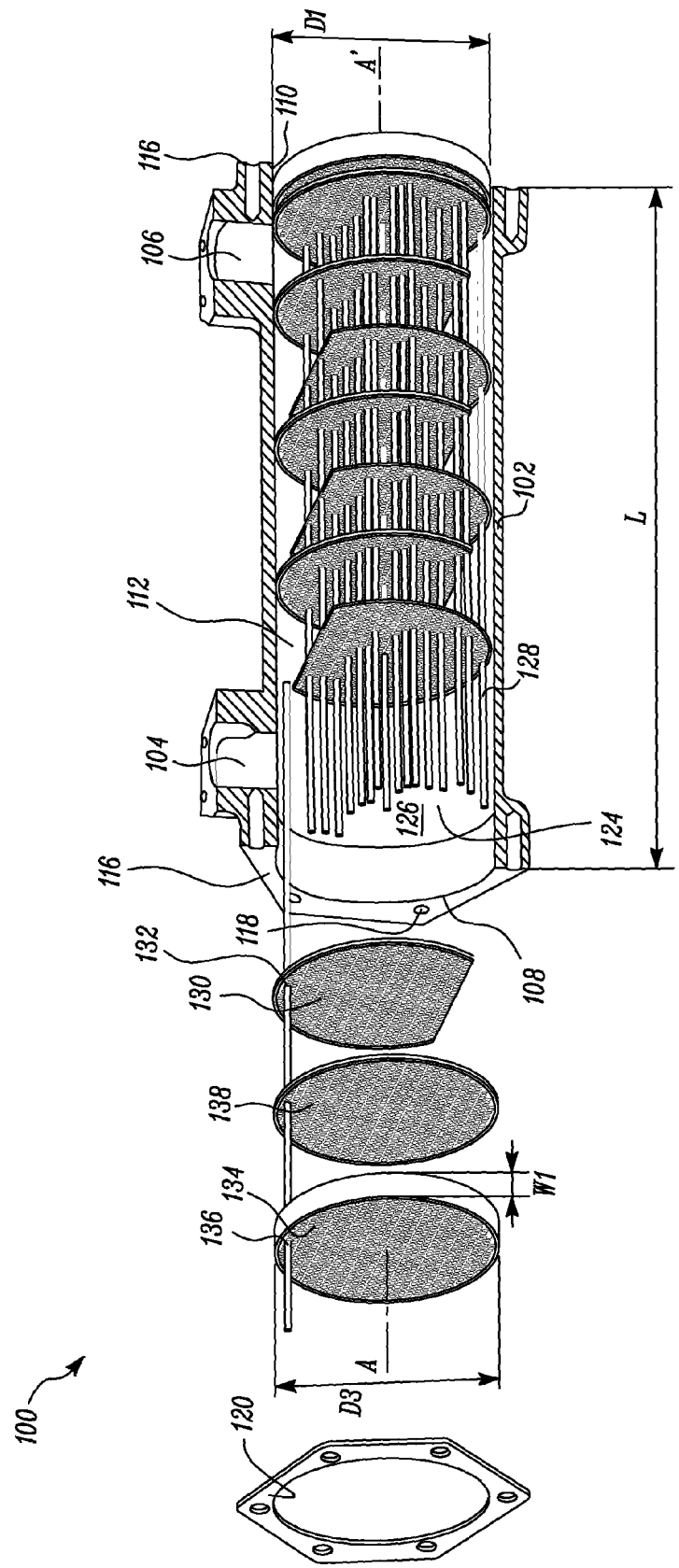
FIG. 1 is a partial sectional view of an exemplary heat exchanger having a shell.

Wherever possible, the same reference numbers will be used throughout the drawings to refer to same or like parts. FIG. 1 illustrates an exemplary heat exchanger 100. The heat exchanger 100 facilitates transfer of thermal energy between two or more fluids. The fluids may include liquids, gasses, or any combination of liquids and gasses. For example, the fluids may include air, exhaust, oil, coolant, water, or any other fluid known in the art. The heat exchanger 100 may be used to transfer thermal energy in any type of fluid system, such as, an exhaust and/or air cooling system, a radiator system, an oil cooling system, a condenser system, or any other type of fluid system known in the art. In an example, the heat exchanger 100 may be an oil cooler for a machine, such as an internal combustion engine.

The heat exchanger 100 includes a shell 102 defining a longitudinal axis A-A'. The shell 102 may define an inlet port 104 configured to receive a fluid therethrough and an outlet port 106 configured to discharge the fluid from the shell 102. The inlet port 104 and the outlet port 106 may be defined adjacent to ends 108, 110 of the shell 102, respectively. The shell 102 has an inner surface 112 defining an inner diameter D1. The inner surface 112 may be disposed in between both the ends 108, 110 of the shell 102. Moreover, the inner surface 112 may have a length L along the longitudinal axis A-A'.

The shell 102 may also include a flange portion 116 at each of the ends 108, 110 of the shell 102. The flange portion 116 may extend from each of the ends 108, 110 of the shell 102 along a direction perpendicular to the longitudinal axis A-A'. Although a hexagonal shape is illustrated for the flange portion 116, a person of ordinary skill will recognize that the flange portion 116 may have other shapes such as, but not limited to, circular, polygonal and the like. The flange portion 116 may also define multiple apertures 118.

A sealing member 120 may be coupled to each flange portions 116 disposed at the ends 108, 110. The coupling may be accomplished via multiple fastening members (not shown) received within the apertures 118 defined in the flange portion 116. In various examples, the fastening members may be bolts or screws. The sealing member 120 may be configured to prevent leakage of the fluid from the corresponding ends 108, 110 of the shell 102. In an example, the sealing member 120 may be a gasket.

The heat exchanger 100 also includes a tube assembly 124 that is configured to be at least partly received within the shell 102. More specifically, the tube assembly 124 may be mounted within a cavity 126 defined by the shell 102. The tube assembly 124 may include multiple tubes 128 formed into a bundle. The bundle may have any cross-sectional profile, for example, circular, polygonal, and the like. The tubes 128 may be configured to receive a fluid therein.

In an example, the heat exchanger 100 may also include an inlet header (not shown) and an outlet header (not shown) disposed adjacent to the ends 108, 110, respectively. Alternatively, the inlet and outlet headers may be disposed adjacent to one of the ends 108, 110. The tubes 128 may be in fluid communication with the inlet and outlet headers. The inlet header may be configured to receive a fluid therein. The fluid may be distributed among the tubes 128. Further, the outlet header may be configured to collect the fluid from the tubes 128 and discharge the collected fluid.

The tube assembly 124 may also include one or more baffles 130 spaced along the longitudinal axis A-A' of the shell 102. The baffles 130 may be configured to deflect a flow of the fluid inside the shell 102. Each of the baffles 130 may define openings 132 that are configured to partly receive the tubes 128 therethrough. The baffles 130 along with the tubes 128 may define a flow path for the fluid received in the shell 102 in order to enhance heat transfer. The path may vary depending on a configuration of the tube assembly 124. In operation, hot oil or other fluid may enter the heat exchanger 100 through the inlet port 104. The fluid may then travel along the tube assembly 124 and exit the heat exchanger 100 at a lower temperature through the outlet port 106. The fluid flowing through the tubes 128 may be a coolant configured to absorb heat from hot oil.

The heat exchanger 100 further includes an end member 134. The end member 134 may be disposed on each of portions of the inner surface 112 adjacent to the ends 108, 110 of the shell 102. The end member 134 defines multiple openings 136 configured to at least partly receive the tubes 128 therethrough. Moreover, the openings 136 defined in the end member 134 may be co-axial with the openings 132 defined in the baffles 130.

The end member 134 may be made of a resilient material, for example rubber. As shown in FIG. 1, the end member 134 may have a diameter D3 and a width W1. The diameter D3 of the end member 134 may be greater than the inner diameter D1 of the inner surface 112. The end member 134 may be assembled into the shell 102 using a press. Moreover, the end member 134 may be configured to deform during the assembly. As such, an interference fit may be accomplished between the shell 102 and the inner surface 112. As shown in FIG. 1, a sheet member 138 may also be disposed adjacent to the end member 134. The end member 134 along with the sheet member 138 may be configured to retain the tube assembly 124 within the shell 102.

In some cases, the assembly or a disassembly of the end member 134 from the shell 102 may cause abrasion and/or wear to a portion of the inner surface 112 of the shell 102. The portion of the inner surface 112 undergoing abrasion and/or wear may be located adjacent to the ends 108, 110 of the shell 102. In an example, difference in dimensions and shape between the inner surface 112 and the end member 134 may cause abrasion of at least a portion of the inner surface 112. Moreover, a force applied by the press, a deformation of the end member 134 may cause further abrasion and/or wear to at least a portion of the inner surface 112.

In operation, the shell 102 may be subject to compressive forces and friction. Therefore, a prolonged and/or continuous use of the heat exchanger 100 may also cause at least one of wear, erosion, damage, abrasion or other defects to at least a portion of the inner surface 112.

Figure 4:
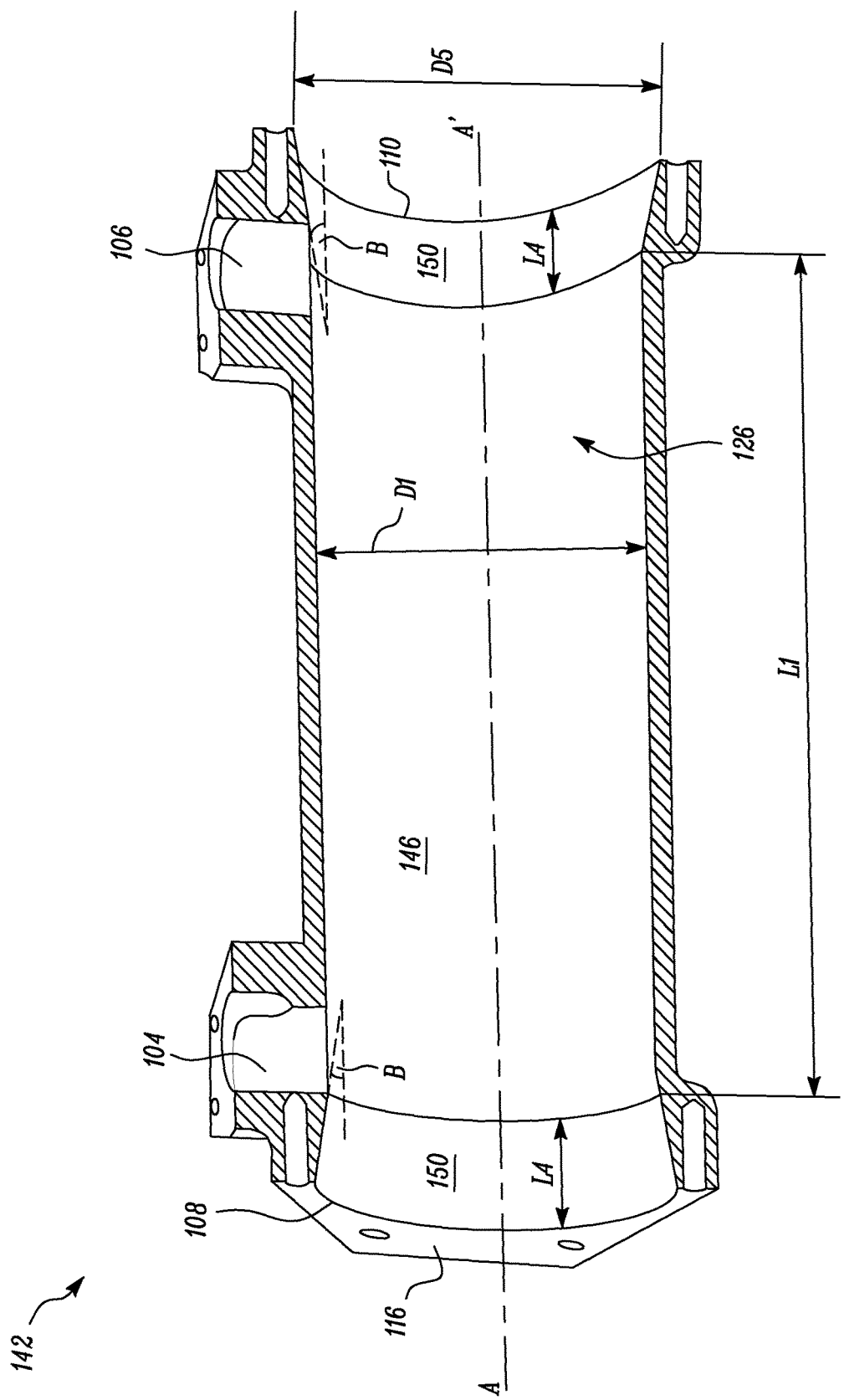
FIG. 4 is a sectional view of the remanufactured shell showing a tapered surface, according to an embodiment of the present disclosure.
Figure 5:
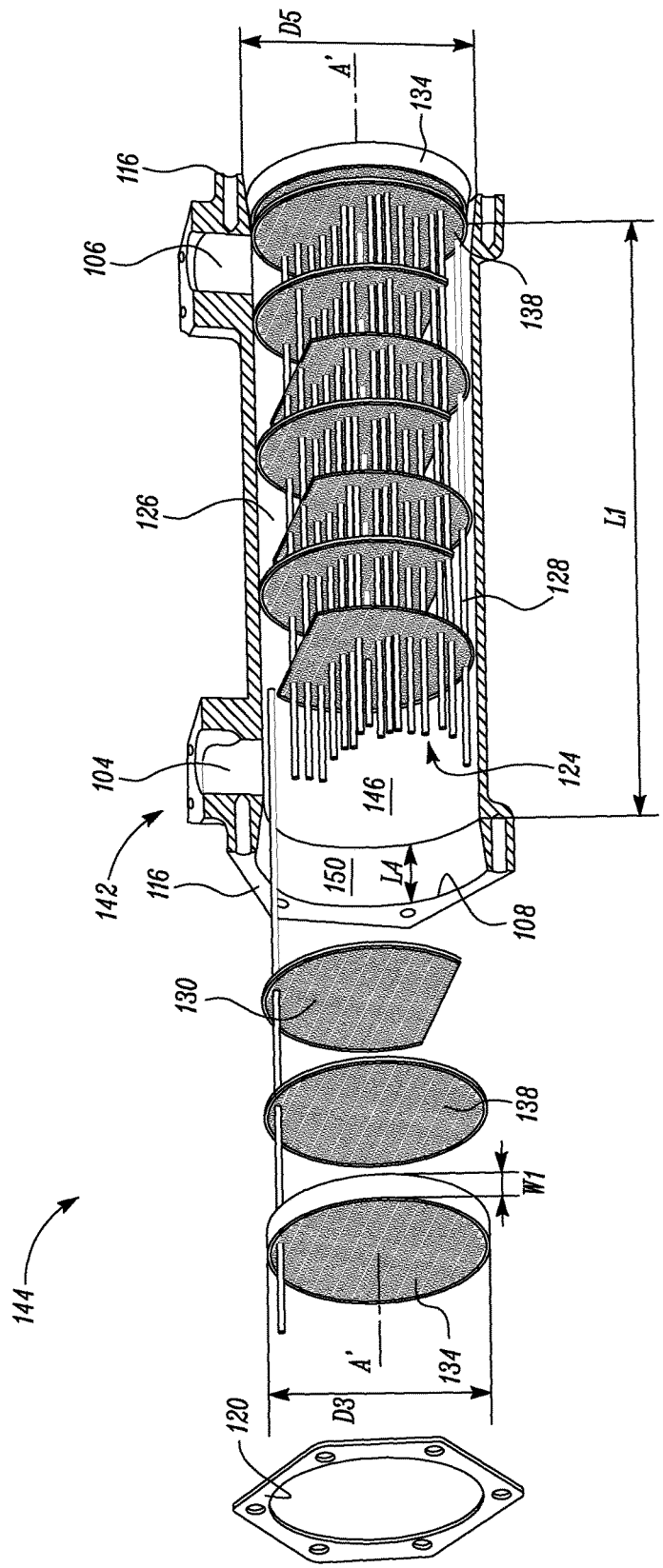
FIG. 5 is a partial sectional view of a heat exchanger showing an end member inserted into the tapered surface of the remanufactured shell, according to an embodiment of the present disclosure.

As shown in FIG. 2, the inner surface 112 may include a worn portion 140. The worn portion 140 is shown to be adjacent to the end 108 of the shell 102. However, another worn portion (not shown) may also be present adjacent to the end 110 of the shell 102. The worn portion 140 may have a length L3 along the longitudinal axis A-A'. The length L3 of the worn portion 140 may be less than or equal to the width W1 of the end member 134. Alternatively, the length L3 may be greater than the width W1 of the end member 134. The shell 102 of the heat exchanger 100 may be remanufactured to obtain a remanufactured shell 142, as will be described hereinafter in detail. Referring to FIGS. 3 to 5, the remanufactured shell 142 is illustrated.

The remanufactured shell 142 includes an inner surface 146. The inner surface 146 has a length L1 (shown in FIG. 4). Further, the inner surface 146 has the inner diameter D1. The inner surface 146 of the remanufactured shell 142 may be obtained by performing one or more machining operations on the inner surface 112 of the shell 102.

FIG. 3 illustrates a portion adjacent to the inner surface 146 that is obtained upon removing the worn portion 140. The worn portion 140 may be removed via one or more machining processes. Such machining processes may be accomplished using commonly known methods and/or machines known in the art.

Referring now to FIGS. 4 and 5, the remanufactured shell 142 may further include a tapered surface 150. The tapered surface 150 may extend from the inner surface 146 towards each of the ends 108, 110 of the shell 142. A diameter of the tapered surface 150 may increase progressively from the inner diameter D1 of the inner surface 146 to a maximum diameter D5 at each of the ends 108, 110 of the shell 102. In the illustrated embodiment, the diameter of the tapered surface 150 may increase linearly along the longitudinal axis A-A'. However, in alternative embodiments, the diameter of the tapered surface 150 may increase in a non-linear manner along the longitudinal axis A-A'.

In an embodiment, an angle 'B' of the tapered surface 150 relative to the longitudinal axis A-A' may be in a range of 2 to 15 degrees. The angle 'B' may depend on a thickness of the remanufactured shell 142 and other design requirements of the associated heat exchanger. Further, the tapered surface 150 has a length L4 along the longitudinal axis A-A'. The tapered surface 150 of the remanufactured shell 142 may be obtained by performing one or more machining operations on the inner surface 112 of the shell 102.

Referring to FIG. 5, a heat exchanger 144 employing the remanufactured shell 142 is illustrated. The heat exchanger 144 may also include the tube assembly 124 and the end member 134. In an embodiment, the maximum diameter D5 of the tapered surface 150 may be greater than or equal to the diameter D3 of the end member 134. Further, the length L4 of the tapered surface 150 may be approximately equal to the width W1 of the end member 134.

Although, the remanufactured shell 142 is explained in conjunction with a remanufacturing process employed on the shell 102, one of ordinary skill will appreciate that the shell 142 with the tapered surface 150 may also be manufactured as an original component.

INDUSTRIAL APPLICABILITY

Figure 6:
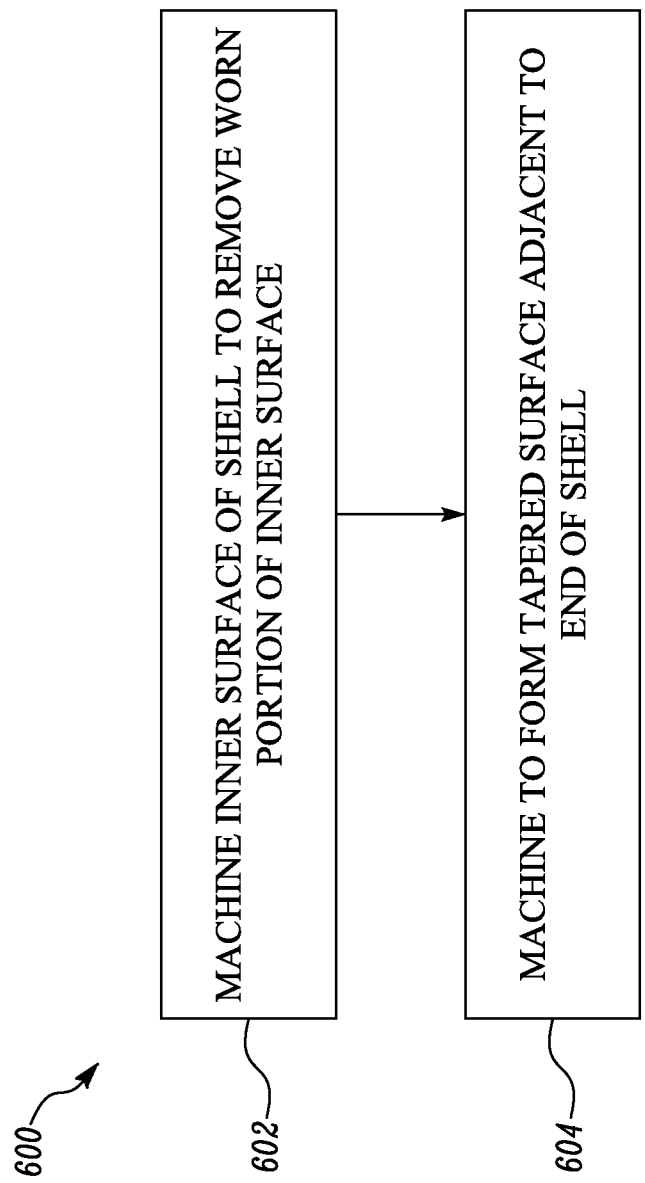
FIG. 6 is a flowchart illustrating a method of remanufacturing a shell of a heat exchanger, according to an embodiment of the present disclosure.

The present disclosure is related to a method 600 for remanufacturing a shell of a heat exchanger, according to an embodiment of the present disclosure. Referring to FIG. 6, a flowchart for the method 600 of remanufacturing the shell 102 of the heat exchanger 100 is illustrated.

At step 602, the method 600 includes machining the inner surface 112 to remove the worn portion 140. The machining may include at least one of turning, grinding and milling the inner surface 112. The shell 102 may be held in place via one or more fixtures (not shown) while performing the machining. In one embodiment, the worn portion 140 may be removed initially by a rough machining process.

At step 604, the method includes machining the inner surface 112 of the shell 102 to form the tapered surface 150 of the remanufactured shell 142. In one embodiment, the tapered surface 150 may be machined by a taper turning operation. Moreover, the tapered surface 150 may be further machined to provide a surface finish via operations such as, but not limited to, grinding, honing and the like.

The tapered surface 150 may be formed adjacent to each of the ends 108, 110 of the shell 102. The diameter of the tapered surface 150 may increase progressively from the inner diameter D1 of the shell 102 to the maximum diameter D5 at the corresponding ends 108, 110 of the shell 102. In an embodiment, the angle 'D' of the tapered surface 150 relative to the longitudinal axis A-A' may be in a range of 2 to 15 degrees. The tapered surface 150 has the maximum diameter D5 at the ends 108, 110 of the remanufactured shell 142. Further, the maximum diameter D5 of the tapered surface 150 may be greater than or equal to the diameter D3 of the end member 134.

After implementing the method 600 to obtain the remanufactured the shell 142, various other components, such as the tube assembly 124, the end members 134, the sealing members 120 may be assembled together. The shell 142 may be held in an upright position by commonly known fixtures. The tube assembly 124 may be assembled into the cavity 126 defined in the shell 102. Thereafter, the end member 134 is press-fitted into the shell 142 via a press.

The tapered surface 150 may facilitate easy assembly of the end member 134 into the remanufactured shell 142. In particular, the end member 134 may be easily inserted into the shell 142 as the maximum diameter D5 of the tapered surface 150 at each of the ends 108, 110 may be greater than or equal to the diameter D3 of the end member 134. However, since the inner diameter D1 of the inner surface 146 is lesser than the diameter D3 of the end member 134, the end member 134 may be retained within the shell 142. Further, the end member 134 may also be easily removed from the shell 142 for maintenance and/or replacement purposes. The tapered surface 150 may reduce abrasive contact between the end member 134 and the shell 142, thereby decreasing wear, erosion or other defects of the shell 142 associated with the assembly and/or disassembly of the end member 134.

Although, the two steps 602, 604 are described as discrete steps, one of ordinary skill in the art will recognize that both the steps 602, 604 may be performed at the same time using a single operation such as, taper turning. Such an operation may both remove the worn portion 140 and also provide the tapered surface 150.

Thus, the method 600 may be implemented to remanufacture an existing shell having a worn or damaged inner surface. The remanufactured shells may be reused in heat exchangers. This may be cost efficient as compared to replacement of an existing shell with a new shell.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method of remanufacturing a shell of a heat exchanger, the shell having an inner surface defining an inner diameter thereof, the inner surface having a worn portion adjacent to an end of the shell, the method comprising:
   machining the inner surface to remove the worn portion of the inner surface; and
   machining to form a tapered surface adjacent to the end of the shell, wherein a diameter of the tapered surface increases progressively from the inner diameter of the shell to a maximum diameter at the end of the shell, wherein the tapered surface is configured to receive an end member of the heat exchanger, and wherein a length of the tapered surface along a longitudinal axis of the shell is approximately equal to a width of the end member.

2. The method of claim 1, wherein the machining of the inner surface includes at least one of turning, grinding and milling the inner surface.

3. The method of claim 1, wherein the maximum diameter of the tapered surface is greater than or equal to a diameter of the end member.

4. The method of claim 1, wherein an angle of the tapered surface relative to a longitudinal axis of the shell is in a range of 2 to 15 degrees.

5. A shell for a heat exchanger, the shell comprising:
   an inner surface defining an inner diameter of the shell; and
   a tapered surface extending from the inner surface to an end of the shell, wherein a diameter of the tapered surface increases progressively from the inner diameter of the shell to a maximum diameter at the end of the shell, wherein the tapered surface is configured to receive an end member of the heat exchanger, and wherein a length of the tapered surface along a longitudinal axis of the shell is equal to a width of the end member.

6. The shell of claim 5, wherein the maximum diameter of the tapered surface is greater than or equal to a diameter of the end member.

7. The shell of claim 5, wherein an angle of the tapered surface relative to a longitudinal axis of the shell is in a range of 2 to 15 degrees.

8. The shell of claim 5, wherein the shell comprises a flange portion at the end thereof, the flange portion extending from the tapered surface along a direction perpendicular to a longitudinal axis of the shell.

9. The shell of claim 8, wherein the flange portion defines a plurality of apertures, the plurality apertures configured to receive a plurality of fastening members to secure a sealing member onto the flange portion.

10. A heat exchanger comprising:
a shell including:
an inner surface defining an inner diameter of the shell; and
a tapered surface extending from the inner surface to an end of the shell, wherein a diameter of the tapered surface increases progressively from the inner diameter of the shell to a maximum diameter at the end of the shell;
a tube assembly at least partly received within the shell; and
an end member received in the tapered surface adjacent to the tube assembly wherein a length of the tapered surface along a longitudinal axis of the shell is equal to a width of the end member.

11. The heat exchanger of claim 10, wherein the maximum diameter of the tapered surface is greater than or equal to a diameter of the end member.

12. The heat exchanger of claim 10, wherein an angle of the tapered surface relative to a longitudinal axis of the shell is in a range of 2 to 15 degrees.

13. The heat exchanger of claim 10, wherein the shell further comprises a flange portion at the end thereof, the flange portion extending from the tapered surface along a direction perpendicular to a longitudinal axis of the shell.

14. The heat exchanger of claim 13, wherein the flange portion defines a plurality of apertures, the plurality of apertures configured to receive a plurality of fastening members to secure a sealing member onto the flange portion.

15. The heat exchanger of claim 10, wherein the tube assembly comprises:
a plurality of tubes configured to receive a fluid therein; and
a plurality of baffles spaced along a longitudinal axis of the shell, each of the plurality of baffles defining a plurality of openings configured to partly receive the plurality of tubes therethrough.

16. The heat exchanger of claim 10, wherein the end member defines a plurality of openings configured to at least partly receive the plurality of tubes therethrough.

17. The heat exchanger of claim 10, wherein the shell defines an inlet port to receive a coolant therein and an outlet port configured to discharge the coolant from the shell.

* * * * *